United States Patent [19]

Witschard

[11] 4,192,828

[45] Mar. 11, 1980

[54] POLYMER COMPOSITIONS HAVING ENHANCED LOW TEMPRATURE IMPACT RESISTANCE ON AGEING

[75] Inventor: Gilbert Witschard, Grand Island, N.Y.

[73] Assignee: Hooker Chemicals & Plastics Corp., Niagara Falls, N.Y.

[21] Appl. No.: 892,226

[22] Filed: Mar. 31, 1978

Related U.S. Application Data

[63] Continuation-in-part of Ser. No. 881,949, Feb. 28, 1978.

[51] Int. Cl.[2] .................... C08L 53/02; C08L 57/08
[52] U.S. Cl. ..................................................... 525/83
[58] Field of Search .................... 260/876 B, 876 R

[56] References Cited

U.S. PATENT DOCUMENTS

| | | | |
|---|---|---|---|
| 3,557,252 | 1/1971 | Hsieh et al. | 260/876 B |
| 3,975,458 | 8/1976 | Severini et al. | 260/876 R |
| 4,161,472 | 7/1979 | Lehr | 525/84 |

OTHER PUBLICATIONS

Chem. Abs., 84:P75098f.

*Primary Examiner*—J. Ziegler
*Attorney, Agent, or Firm*—Peter F. Casella; James F. Mudd; David A. Stein

[57] ABSTRACT

Mixtures of vinyl halide-graft-polyolefin polymer compositions with a minor proportion of a monoalkenyl arene-hydrocarbon alkadiene block thermoplastic elastomer which are capable of being molded to impact-resistant articles exhibit enhancement of low temperature impact resistance on ageing.

15 Claims, No Drawings

POLYMER COMPOSITIONS HAVING ENHANCED LOW TEMPRATURE IMPACT RESISTANCE ON AGEING

CROSS REFERENCE TO RELATED APPLICATION

This application is a continuation-in-part of the copending U.S. application of G. Witschard, Ser. No. 881,949, filed Feb. 28, 1978.

This invention relates to thermoplastic polymer compositions capable of being molded to articles having a high impact resistance. More particularly it is concerned with polymer compositions which contain as the major polymer constituent a vinyl halide-graft polyolefin polymer. It especially relates to vinyl halide graft polymer compositions which gain in low temperature impact resistance on ageing.

BACKGROUND OF THE INVENTION

Polyvinyl halide (inclusive of vinyl halide homopolymers as well as copolymers of vinyl halide with up to about fifty percent of olefinic comonomer copolymerizable with the vinyl halide) is a widely used thermoplastic having a number of favorable technological properties. However polyvinyl halide, e.g. vinyl chloride homopolymer, breaks on impact very easily at ambient temperature and at still lower or sub-ambient temperatures. Thus at ambient temperature, i.e. at about 20° C., corresponding to about 68° F., the notched Izod impact resistance of the aforementioned vinyl halide homo- and copolymers is only of the order of about 0.4 to less than about 1 ft-lb./in. At sub-ambient temperatures, e.g. down to −20° F. or lower, the notched Izod impact resistance of these polymers becomes vanishingly small or negligible. Generally the ambient temperature impact resistance of conventional vinyl halide polymers is enhanced by mechanically blending the vinyl halide with a minor proportion, i.e. less than 50%, of an impact enhancing elastomer additive, such as a methyl methacrylate-1,3-butadiene-styrene graft polymer, conventionally termed a polyvinyl halide impact modifier. The aforementioned impact modifiers moderately enhance the ambient temperature impact resistance of vinyl halide polymers, i.e. generally raise the ambient temperature notched Izod impact resistance of the polymer to about 2 to 10 ft-lbs/in. However, these impact modifiers are relatively ineffective in imparting a satisfactory sub-ambient temperature impact resistance to the polymer, i.e. the −20° F. notched Izod impact resistance of the polymer containing the impact modifier is well below 1 ft-lb./in. and usually is about 0.4 to 0.5 ft-lb/in.

It has been discovered that polymerization of vinyl halide (or a monomer mixture of vinyl halide and copolymerizable ethylenically unsaturated comonomers) in the presence of a hydrocarbon polyolefin elastomer results in a polymer product (a vinyl halide-graft-polyolefin polymer) which contains vinyl halide polymer chains bound, i.e. grafted, at random points along the chain of the trunk olefin polymer as well as ungrafted vinyl halide polymer. The graft polymer product, especially the graft polymer product prepared by a liquid phase bulk polymerization reaction, has a substantially enhanced impact resistance at both ambient temperature and sub-ambient temperatures compared to the aforementioned conventional, i.e. ungrafted, vinyl halide polymers even when the latter are blended with a conventional polyvinyl halide impact modifying polymer additive. The bulk polymerization-prepared graft polymer product is even distinguished from the corresponding graft polymer prepared by a non-bulk polymerization technique, e.g. suspension polymerization, by an enhanced impact resistance at both low and ambient temperature and by breakage by the desirable ductile breakage mode rather than by an undesirable brittle breakage mode.

Although the aforementioned graft polymer possesses a subambient low temperature impact resistance substantially greater than that of conventional impact modifier-containing vinyl halide polymer compositions, the low temperature impact resistance of the graft polymer is found to decrease on ageing. Thus, for example, a molded article of the graft polymer, on ageing at ambient temperature for about one month or longer (or at an elevated temperature for proportionally shorter periods), tends to lose a significant amount, e.g. up to 35%, of its original high low temperature impact resistance. This loss of low temperature impact resistance on ageing is a particularly serious disadvantage when the graft polymer is employed in outdoor applications in a temperate climate wherein sub-ambient temperatures of the order 0° F. to −20° F. or even lower are often encountered during winter months (subsequent to summer months wherein the graft polymer is subjected to relatively high temperatures, e.g. of the order of 80°-100° F. or even higher, which serve to accelerate the ageing loss of low temperature impact resistance).

The foregoing problem of loss of low temperature impact resistance on ageing of the present graft polymer has been overcome in accordance with the invention by blending of the graft polymer with a small proportion of a monoalkenyl arene-alkadiene hydrocarbon block thermoplastic elastomer (typified by a block copolymer of styrene and 1,3-butadiene or isoprene) more fully described hereinafter. The prior art does not disclose or suggest awareness of the above-described ageing problem associated with the present vinyl halide-graft-hydrocarbon polyolefin polymers or teach or suggest that this problem is overcome by incorporation of the aforementioned block elastomers in the graft polymer.

U.S. Pat. No. 4,048,254, (E. L. Hillier et al., issued Sept. 13, 1977) discloses polymer mixtures containing two block radial elastomers of 1,3-butadiene and styrene having different diene contents together with 5 to 75% (based on the weight of the block polymers) of certain other polymers, namely epoxide polymers, acrylic polymers, styrene-acrylonitrile polymers, polycarbonates, polyolefins, polystyrenes, polyvinyl chloride, olefin/polyvinyl chloride copolymers, preferably polyether-and polyester-urethane polymers, methyl methacrylate-styrene-1,3-butadiene copolymers, and methyl methacrylate-acrylonitrile-styrene-1,3-butadiene copolymers, as well as mixtures thereof. The reference compositions have a sufficient clarity, hardness, tensile strength and elongation to render them suitable for use in medicinal applications particularly as a replacement for vinyl halide polymers. This reference does not disclose a particular combination of a vinyl halide polymer or copolymer with the block polymers or relate to compositions having an improvement in impact resistance (especially in sub-ambient temperature impact resistance on ageing of the composition). It is particularly emphasized that the reference disclosure relating to vinyl halide polymers and copolymers thereof with olefins is not descriptive or suggestive of the present graft polymers which are highly distinctive from conventional vinyl halide polymers and copolymers in their properties (especially their low temperature impact properties). Accordingly, this reference does not teach or suggest the present invention.

U.S. Pat. No. 4,048,255, (E. L. Hillier et al., issued Sept. 13, 1977) discloses a nonclear mixture of two radial block copolymers of 1,3-butadiene and styrene having different diene contents with 3–75% (based on the weight of the block polymers) of another polymeric material namely polyolefin-butyl rubber graft copolymers, chlorinated polyethylene, styrene-olefin block copolymers, polyether urethane elastomers, polyisobutylene and mixtures thereof. The reference mixtures have sufficient elasticity and resealability to be employed as pharmaceutical sealing compositions. The polymers which are employed by the reference as substrates for the block polymer additives do not include or suggest the present vinyl halide graft polymers. The physical properties of the reference compositions do not include or suggest impact resistance properties especially enhancement of low temperature impact resistance on ageing. Accordingly, this reference also does not teach or suggest the present invention.

U.S. Pat. No. 3,366,709, (M. Baer, issued Jan. 30, 1968) is directed to graft polymers of vinyl halide upon a trunk polymer which is a copolymer of a monoolefin such as ethylene or isobutylene and vinylidene chloride. The reference vinyl halide-graft polyvinylidene chloride/olefin polymers are prepared by bulk, solution emulsion or preferably suspension polymerization and have an enhanced impact resistance at sub-ambient temperatures compared to mechanical blends of ungrafted polyvinyl halide and the vinylidene chloride-olefin copolymer. The reference graft polymer is distinctive from the present graft polymer since the trunk polymer component of the present graft polymer is a hydrocarbon whereas the reference trunk polymer, by virtue of its vinylidene chloride monomer residues, is substituted with chlorine. Moreover at Example VI (Col. 3) the reference teaches against use of a vinyl halide-graft-hydrocarbon polyolefin polymer as a graft polymer component of the reference composition. Accordingly, the reference graft polymer is distinctive in structure and properties from the hydrocarbon trunk polymer-containing graft polymer of the invention. At Col. 1, lines 19–30, the reference discusses unsatisfactory prior art attempts to improve the low temperature impact resistant properties of conventional, i.e. ungrafted, vinyl halide polymers mentioning that it is known to mechanically blend the vinyl halide polymer with polymeric materials, inter alia, butadiene-styrene polymers. As pointed out by the reference at Col. 1, line 28, the prior art use of such polymer additives only improved low temperature impact strength of vinyl halide resins by sacrifice of another desirable physical property, such as high heat distortion temperature. This reference disclosure is not seen to suggest the present block polymers which, as explained below, are highly distinctive structurally from well-known randomly polymerized butadiene-styrene copolymers, e.g. conventional styrene-butadiene rubber, and possess, as a result, highly distinctive properties such as self vulcanization (i.e. exhibition of vulcanization properties without vulcanization-produced chemical cross linkages) over the conventional styrene-butadiene elastomers. While the reference, at Col. 5, lines 60–66, lists a number of polymeric additives which may desirably be mechanically blended with the reference graft polymer composition, the list does not include the aforementioned styrene-butadiene polymer additive mentioned in Col. 1. The reference, it is noted, nowhere alludes to the problem of loss of low temperature impact resistance of vinyl halide-hydrocarbon polyolefin graft polymers on ageing. Since the reference does not teach or suggest the present graft polymer or the present block polymer additive, it does not teach or suggest the invention. In teaching away from the present types of vinyl halide graft polymer (i.e. from one derived from hydrocarbon polyolefin trunk polymers) and from copolymers of styrene and butadiene in general as additives for polyvinyl halide resins, in general, the reference is, moreover, seen to teach away from the invention.

N. Platzer, Chemtech, October 1977, pages 364–641 discloses the use of the present block thermoplastic elastomers as components for enhancing the impact resistance of high impact polystyrene and acrylonitrile-1,3-butadiene-styrene copolymers. Also it is known to employ these block polymers as impact modifiers in polyethylene and polypropylene. As is apparent by comparison of Examples 1–3 with Control Example 4 of this application, the block polymer additive, prior to ageing, lowers the low temperature impact resistance of the vinyl halide graft polymer in which it is incorporated so that the block polymer would not be regarded as a low temperature impact modifier for the present graft polymers. Hence, the prior art disclosure of the present block polymers as impact modifiers for the foregoing non-vinyl halide resins does not teach or suggest the invention.

SUMMARY OF THE INVENTION

The invention is directed to an improvement in a vinyl halide-graft-hydrocarbon polyolefin polymer composition capable of being molded to an impact-resistant article wherein, as the improvement, the composition comprises a block thermoplastic elastomer wherein the major proportion of the monomer units are residues of a monoalkenyl arene of the benzene or naphthalene series of 8 to 20 carbon atoms and a conjugated alkadiene hydrocarbon of 4 to 10 carbon atoms, the proportion of block elastomer being about 1% to 20% based on the combined weight of the graft polymer and the block elastomer.

DETAILED DESCRIPTION OF THE INVENTION AND PREFERRED EMBODIMENTS THEREOF

The addition of the block elastomer to the graft polymer according to the invention results in a composition which gains in low temperature impact resistance, e.g. impact resistance at sub-ambient temperature down to temperatures as low as −20° F. or lower, upon ageing of the composition (e.g. at ambient temperature for 1 or more months or under a corresponding accelerated ageing period of 48 hours at 65° C.).

Although the non-aged molded blend of the graft polymer and the block elastomer of the invention has a low or sub-ambient temperature impact resistance substantially lower than that of the corresponding composition containing only the graft polymer, ageing of the preferred graft polymer-block elastomer mixtures of the invention enhances the low temperature impact resistance of the composition to a low temperature impact resistance substantially corresponding to that of the corresponding non-aged composition containing the unmodified vinyl halide graft polymer, i.e. the impact resistance at low temperature, e.g. −20° F., of such preferred compositions of the invention, after ageing, is no more than about 3–12% less than that of the non-aged, unmodified graft polymer composition. In other words the addition of the block elastomer to the graft polymer according to a preferred embodiment of the invention provides, in effect, stabilization of low temperature impact resistance of the graft polymer.

It is noteworthy that the enhancement of low temperature impact resistance on ageing which is accomplished by the additives of the invention does not occur with block thermoplastic elastomer additives which are the hydrogenated derivatives of the present block thermoplastic elastomers, i.e. derivatives of the present block elastomers, wherein the diene-derived monomer residues of the elastomer are hydrogenated to saturate the ethylenic unsaturation in the diene residues. Such hydrogenated block thermoplastic elastomers (manufactured under the general designation Kraton G) when incorporated in the present vinyl halide graft polymers produce a loss of low temperature impact resistance on ageing (as is illustrated by the results of Example 5 below).

The incorporation of the present block polymer into the vinyl halide graft polymer to provide age-enhancement of low temperature impact resistance according to the invention does not deleteriously affect, to any substantial extent, the other desirable properties of the graft polymer such as the heat distortion temperature and the thermal stability of the molten polymer (as measured in a Brabender Plastograph). If desired, according to one aspect of the invention, the present compositions may contain impact resistance enhancing additives such as the graft polymer of acrylonitrile and styrene on poly-1,3-butadiene, i.e. ABS polymer, and methylmethacrylate-1,3-butadiene-styrene graft polymer, i.e. MBS polymer. For example, the aforementioned copending application of G. Witschard entitled "Vinyl Halide Polymer Blends of Enhanced Impact Resistance", U.S. Ser. No. 881,949, filed Feb. 28, 1978 of which this application is a continuation-in-part, discloses that blending of vinyl halide polymers which have been modified with a conventional methyl methacrylate-1,3-butadiene-styrene impact modifier with the present alkenyl arene-hydrocarbon alkadiene block elastomers results in synergistic enhancement of impact resistance at ambient temperature. The vinyl halide polymer substrates disclosed by the application can be conventional, i.e. ungrafted, vinyl halide polymers and copolymers, but also include the present vinyl halide graft polymers. Desirably, however, according to the invention block thermoplastic elastomer is the only polymeric additive employed in the compositions of the invention which substantially affects impact resistance.

THE VINYL HALIDE-GRAFT-HYDROCARBON POLYOLEFIN POLYMER COMPONENT

The vinyl halide graft polymer component of the invention is advantageously the product of the free radical bulk liquid phase polymerization of vinyl halide monomer (or a mixture of vinyl halide monomer and up to 50% of an ethylenically unsaturated comonomer based on the total weight of monomers) in the presence of a hydrocarbon trunk polyolefin, i.e. an olefin trunk polymer containing only hydrogen and carbon.

When a mixture of vinyl halide monomer and an ethylenically unsaturated comonomer or comonomers is employed in the preparation of the graft polymer component of the compositions, the comonomer is desirably employed in a proportion of about 1 to 50% preferably 1 to 30% based on the total weight of the monomers employed in the graft polymerization reaction.

Suitable ethylenically unsaturated compounds copolymerizable with vinyl halide monomer which can be employed as comonomers with the vinyl halide monomer reactant to prepare the present graft polymers include the following monoolefinic compounds: ethylene, propylene, butene-1, 4,4-dimethylbutene-1, decene-1, styrene and its nuclear alpha-alkyl or aryl substituted derivatives, e.g., o-, m- or p-methyl, ethyl, or butyl styrene; and halogenated styrenes such as alpha-chlorostyrene; monoolefinically unsaturated esters including vinyl esters, e.g., vinyl acetate, vinyl stearate, vinyl benzoate, vinyl-p-chlorobenzoates, alkyl methacrylates, e.g., methyl, ethyl, propyl and stearyl methacrylate, alkyl crotonates, e.g., octyl crotonate; alkyl acrylates, e.g., methyl, 2-ethyl hexyl, stearyl acrylates; hydroxyether and tertiary butylamino acrylates, e.g. 2-ethoxy ethyl acrylate, isopropenyl esters, e.g., isopropenyl acetate; isopropenyl halides, e.g., isopropenyl chloride; vinyl esters of halogenated acids, e.g., vinyl alpha-chloroacetate, and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols; e.g., beta-ethyl allyl alcohol; haloalkyl acrylates, e.g., methyl and ethyl alpha-chloroacrylates; alkyl alpha-cyanoacrylates, e.g., methyl alpha-cyanoacrylate; itaconates, e.g., monomethyl itaconate, diethyl itaconate, alcohol (C-3 to C-8) itaconates; maleates, e.g., monomethyl maleate, diethyl maleate, alcohol (C-3 to C-8) maleates; and fumarates, e.g., monomethyl fumarate, diethyl fumarate, alcohol (C-3 to C-8) fumarates, and diethyl glutaconate; monoolefinically unsaturated organic nitriles including, for example, fumaronitrile, acrylonitrile, methacrylonitrile, 1,1-dicyanopropene-1, and oleonitrile; monoolefinically unsaturated carboxylic acids including, for example, acrylic acid, methacrylic acid, cinnamic acid, maleic, and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl 2-chloroethyl ether, vinyl cetyl ether, and the like; and vinyl sulfides, e.g., vinyl beta-chloroethyl sulfide, vinyl beta-ethoxyethyl sulfide and the like can also be included as can diolefinically unsaturated hydrocarbons containing two olefinic groups in conjugated relation and the halogen derivatives thereof, e.g. butadiene-1,3; 2-methyl-butadiene-1,3; 2,3-dichlorobutadiene-1,3; and 2-bromobutadiene-1,3 and the like.

While a mixture of vinyl halide and copolymerizable olefinic monomers can be employed as the monomer reactant in preparing the graft polymer, it is preferred that the monomer reactant be composed only of vinyl halide monomer.

The vinyl halide monomer reactant employed in the preparation of the present vinyl halide graft polymer component of the composition of the invention is typically vinyl chloride, vinyl bromide, vinyl iodide, vinylidene chloride, vinylidene bromide, vinylidene iodide or mixtures thereof. Preferably the vinyl halide is vinyl chloride.

The hydrocarbon olefin polymer which is employed as trunk polymer reactant in the preparation of the present graft polymers is generally an elastomer having a weight average molecular weight of about 50,000 to 1,000,000, preferably of about 50,000 to 300,000 which is soluble, partially soluble or dispersible in the liquid phase polymerization reaction mixture. The trunk polyolefin reactant is selected from the group consisting of:
 (A) a homopolymer of an aliphatic hydrocarbon olefin monomer of 2 to 8 carbon atoms;
 (B) a copolymer of 2 or more of said olefin monomers; and
 (C) a polymer of at least one of said olefin monomers and no more than 15% based on the weight of the polymer, of a non-conjugated aliphatic hydrocarbon polyene of 4 to 18 carbon atoms wherein all of the carbon-to-carbon double bonds do not form a conjugated system.

Typically the aliphatic hydrocarbon olefin monomer of the trunk polyolefin is ethene (i.e. ethylene), propene, butene-1, isobutene, octene or 5-methylhexene-1. Typically, the hydrocarbon polyene employed as an optional component of the trunk polyolefin is a linear of cyclic polyene such as 1,4-hexadiene dicyclopentadiene, ethylidene norbornene and the mono- and di- Diels Alder adducts of cyclopentadiene. The polyene which is present in the polyene-modified trunk polymer is preferably a diene and the proportion of the polyene in the trunk polymer is preferably no more than about 6%. The trunk polymer employed in preparing the graft polymer component of the present compositions is preferably a copolymer of two or more of the abovedefined aliphatic hydrocarbon olefins (typified by ethylene-propylene copolymer rubber) or a polymer of at least one of said hydrocarbon olefin monomers and the polyene. An especially good graft polymer is obtained by employing as trunk polyolefin a terpolymer, i.e. ternary copolymer, of two different olefin monomers and a diene, for example an ethylene-propylene-ethylidene norbornene elastomer.

The present graft polymer is prepared employing about 0.05% to about 20%, preferably about 1% to about 20%, based on the weight of the vinyl halide monomer of the trunk hydrocarbon polyolefin reactant employing a conventional free radical initiator compound, (such as benzoyl peroxide, lauroyl peroxide, acetyl cyclohexane sulfonyl peroxide, di-2-ethyl hexyl peroxy dicarbonate, azo-bis-iso-butyronitrile and the like) for the polymerization reaction.

An especially desirable bulk-liquid phase-polymerized vinyl halide graft polymer for use in the invention is obtained by carrying out the graft polymerization by free radical addition polymerization in two reaction stages, i.e. a first stage employing high speed, high shear agitation until conversion of monomer or monomers to polymer is about 3 to 15% and a second stage employing low speed, low shear agitation until polymerization is complete. This technique is disclosed in U.S. Pat. No. 3,522,227 and British Pat. No. 1,047,489, the disclosure of these patents being incorporated herein by reference.

If desired, the graft polymerization can be carried out with addition of the polyolefin trunk polymer subsequent to beginning of the polymerization, i.e. with delayed addition of the trunk polymer reactant, up to about 20% conversion of the vinyl halide monomer to polymer. Also if desired, a minor proportion (i.e. less than about 50%) of the vinyl halide monomer may be removed from the graft polymerization reaction when the conversion of vinyl halide monomer to graft polymer is about 25% to about 45% in order to prepare a graft polymer product having improved finer particles and less reaction scale.

The technology of the preparation and of the distinctive impact resistance properties of the preferred bulk polymerized graft polymer components of the invention is described in more detail in A. Takahashi, U.S. Pat. No. 4,071,582 and copending U.S. patent application Ser. No. 746,046, now U.S. Pat. 4,163,033, L. E. Walker, U.S. Pat. Nos. 4,007,235, and 4,067,928, the disclosures of which are incorporated herein by reference.

THE BLOCK ELASTOMER COMPONENT

The block elastomer component of the compositions of the invention is a thermoplastic block polymer wherein the major proportion of the monomer units are derived from (1) a mono-alkenyl-substituted arene (i.e. aromatic compound) of the benzene or naphthalene series containing 8 to 20 carbons and (2) a conjugated hydrocarbon alkadiene of 4 to 10 carbon atoms.

The monoalkenyl arene of the benzene or naphthalene series employed as a monomer in preparing the block polymer constituent of the present composition can be, for example, styrene; o-, m- or p-methyl styrene; o-, m-, or p-n-butyl-styrene; m-isopropyl-styrene; p-t. butyl-styrene; p-octyl-styrene; 2,3-dimethyl styrene; 3-ethyl styrene; alpha methyl-styrene; p-n-dodecyl-styrene; p-methoxy-styrene; p-n-butoxy-styrene; p-isopropoxy-styrene; p-n-dodecoxy styrene; m-n-octylstyrene; 1-vinyl naphthalene; 2-vinyl-naphthalene; 1-methyl-2-vinyl naphthalene; 1-vinyl-2-n-octyl naphthalene; 1-vinyl-2-isopropyl-naphthalene; 1-vinyl-2-methoxy-naphthalene or mixtures thereof. Preferably the monoalkenyl-substituted arene is a hydrocarbon and the alkenyl group is the vinyl group, $CH_2=CH-$. Preferably also the monoalkenyl-substituted arene is a compound of the benzene series, especially an alkenyl-substituted compound of the benzene series containing up to 12 carbon atoms. Block polymers prepared using styrene as the mono-alkenyl-substituted aromatic monomer are especially preferred.

The conjugated hydrocarbon alkadiene monomer used to prepare the block polymer constituent of the present composition can be, for example, 1,3-butadiene; isoprene; 2,3-dimethyl-butadiene; 2-n-butyl-1,3-butadiene; 1,3-cyclohexadiene; 2-n-hexyl-1,3-butadiene; 1,3-pentadiene; 1,3-hexadiene; 1,3-decadiene; 2-isopropyl-1,3-butadiene; 2-t-butyl-1,3-butadiene; 1,3-cyclodecadiene; 2,4-octadiene; or mixtures of the foregoing cyclic or open chain alkadiene hydrocarbons. Preferably the alkadiene monomer employed in the block polymer constituent of the present composition is an open chain alkadiene and especially is 1,3-butadiene or isoprene.

While it is preferred that all of the monomer units of the present block polymer constituent consist of residues of the foregoing alkadiene and mono-alkenyl-substituted arenes, it is understood that, if desired, minor proportions of the residues of other ethylenically unsaturated compounds copolymerizable with the alkadiene and the alkenyl-substituted aromatic monomer can be present also as comonomer units, for example residues of vinyl pyridine, acrylonitrile, lower alkyl esters of acrylic acid (wherein the term lower alkyl indicates a straight or branched alkyl group of 1 to 6 carbon atoms, e.g. methyl) methacrylonitrile and vinyl carboxylates, e.g. vinyl acetate.

The weight ratio of the mono-alkenyl-substituted aromatic compound residue to the alkadiene residue can vary over a wide range. However, because of their ready availability, the block polymers preferably employed in the invention have a weight ratio of monoalkenyl-substituted arene residue to alkadiene residue in the range of about 1:1 to about 1:10, preferably of about 1:1.5 to about 1:6 and especially of about 1:1.5 to 1:2.3.

The block polymers of the invention are generally prepared by a sequential polymerization of the monomer reactants employing an anionic addition polymerization technique. The reaction is generally carried out in the presence of a catalyst for anionic polymerization, typically an organo lithium catalyst such as n-butyl lithium. (Under the latter reaction conditions a block copolymer is formed substantially to the exclusion of formation of a conventional copolymer, i.e. a random, network, or graft copolymer, of the aforementioned monomers). The polymerization reaction is effected in an inert atmosphere under substantially anhydrous conditions. The polymerization can be carried out in the absence or presence of an inert reaction mixture diluent or solvent such as an ether devoid of functional groups containing active hydrogen, e.g. tetrahydrofuran, or an aromatic hydrocarbon such as benzene, toluene, xylene and the like. Use of an ether solvent is especially advantageous.

The preparation of the aforementioned block polymers is more particularly described in L. M. Potter, U.S. Pat. No. 3,149,182; R. N. Cooper, U.S. Pat. No. 3,030,346; R. P. Zelinski, U.S. Pat. No. 3,287,333; K. J. Silberberg, U.S. Pat. No. 3,380,863, at Col. 3, lines 5–28 and Col. 5, lines 10–40; R. A. Hinton, U.S. Pat. No. 3,452,119; J. K. Craver and R. W. Tess Ed. "Applied Polymer Science", Organic Coating and Plastics Chemistry Div. of American Chem. Soc., 1975, pages 394–429, M. Morton Ed. "Rubber Technology", Van Nostrand-Rheinhold Co., Second Edition, 1973, pages 188, 515–533 and D. C. Allport et al. Ed. "Block Copolymers", Wiley (Halstead Press), 1973, pages 81–87, G. Holden et al., 3,265,765; R. L. Huxtable et al., U.S. Pat. No. 3,198,774, R. E. Dollinger, U.S. Pat. No. 3,297,793; R. E. Dollinger et al., U.S. Pat. No. 3,356,763, *Encyclopedia of Polymer Science and Technology, Vol.* 15, J. Wiley and Sons, 1971 (Supplement) "Styrene-Diene Block Polymers", pages 508–530; and *Encyclopedia of Polymer Science and Technology, Supplement, Vol.* 2, J. Wiley and Sons, 1977, pages 129–132, the disclosures of which are incorporated herein by reference.

The aforementioned block polymers can be linear block polymers composed of two homopolymeric segments or blocks (termed a diblock polymer) or three (termed a triblock polymer) or more homopolymeric segments. In the triblock polymers, generally the residues of the mono alkenyl arene constitute the end block while the residues of the alkadiene constitute the interior block. The block polymers of the invention can be graded or tapered block polymers wherein, for example, one polymer segment or block of the polymer begins with a particular monomer unit and gradually incorporates another monomer unit until at the end, said block is totally composed of the second monomer units. In general in such tapered or graded block polymers (as in the aforementioned triblock polymers) mono-alkenyl arene residues constitute the end blocks while the alkadiene residues constitute the interior block or blocks.

Block polymers of a mono-alkenyl-substituted aromatic hydrocarbon monomer (e.g. styrene) and a hydrocarbon alkadiene (e.g. 1,3-butadiene or isoprene) containing tapered blocks are more particularly described at page 395 of the aforementioned Craver and Tess textbook reference; at pages 83–84 of the aforementioned Allport et al. textbook reference and the aforementioned U.S. Patent of Holden et al., U.S. Pat. No. 3,265,765.

The block thermoplastic elastomers of the invention can also be of star-like or radial polymeric structure wherein 2, 3, 4 or more homopolymeric blocks (advantageously alkadiene blocks) radiate from another, central homopolymeric block (advantageously the monoalkenyl arene block). The latter radial block polymers can be prepared by adding a small amount of a coupling agent (e.g. a polyfunctional alkenyl arene compound such as 1,4-divinyl benzene or a polyfunctional inorganic compound such as silicon tetrachloride) to the partially reacted reaction mass of the aforementioned anionic polymerization (which has already sufficiently reacted to form a diblock polymer).

The preparation of block polymers having a star or radial configuration is described by the Craver and Tess textbook reference at pages 395 (Table II), 421, and 422 (Table VI); by pages 131–132 of the aforementioned article of *The Encyclopedia of Polymer Science and Technology*, Supplement, Vol. 2; by the aforementioned N. Platzer, Chemtech reference, especially page 637, Column 1, lines 33–35 and FIG. 2; by the anonymous article entitled "New Rubber is Backed by Stars", Chemical Week, June 11, 1975, page 35; and especially by R. P. Zelinski et al., U.S. Pat. Nos. 3,078,254 and 3,281,383. The disclosures of the latter four references are also incorporated herein by reference.

Generally use of block thermoplastic elastomers which have the aforementioned radial configuration provide an especially good result according to the invention. It is emphasized that the aforementioned FIG. 2 of the Platzer reference graphically indicates the substantial distinctions between the present block copolymers and corresponding conventional copolymers (including random, network and graft copolymers). The distinctive physical, mechanical and especially processing properties which distinguidh the present thermoplastic block elastomers from conventional elastomers prepared from the same monomers as are employed in block polymers are more particularly discussed in the aforementioned Morton textbook reference.

Block copolymers of styrene and 1,3-butadiene or of styrene and isoprene are readily available as proprietary polymers manufactured under the designation "Kraton" by Shell Chemical Co. and under the designation "Solprene" by Phillips Petroleum Co. As indicated by the fourth and sixth horizontal lines of the aforementioned Table VI of page 422 of the Craver and Tess textbook reference, the Kraton copolymers are linear block polymers (non-hydrogenated) of styrene and 1,3-butadiene or isoprene whereas the Solprene copolymers are radial block polymers or are block polymers containing a tapered block wherein the monomer units are derived from styrene and 1,3-butadiene.

OPTIONAL ADDITIVES

The compositions of the invention may also contain various functional additives, which additives are conventional in the preparation of vinyl halide molding compositions. Typically these additives include thermal and/or light stabilizers, as well as external and internal lubricants, and processing aids for the graft vinyl halide resin component.

Stabilizers suitable for use in making the vinyl halide graft polymer compositions of the invention include all of the materials known to stabilize polyvinyl halide against the degradation action of heat and/or light. They include all classes of known stabilizers, both organic and inorganic such as metal salts of mineral acids, salts of organic carboxylic acids, e.g. carboxylic acids of 6 to 18 carbon atoms, organo-tin compounds, epoxides, amine compounds and organic phosphites. Conveniently a lead salt compound, such as a lead stearate salt or a lead sulfate salt is employed as stabilizer.

A more detailed description of suitable stabilizers, lubricants and processing aids for incorporation into the compositions of the invention is presented in the aforementioned U.S. application of G. Witschard, Ser. No. 881,949, filed Feb. 28, 1978 and in Belgian Pat. No. 855,764 issued Dec. 16, 1977, the disclosures of which are incorporated herein by reference.

Additional classes of additives known for use in polyvinyl halide resins which can be added optionally to the compositions of the invention in addition to the aforementioned stabilizers, lubricants and processing aids include pigments, dyes and fillers as described in L. R. Brecker, *Plastics Engineering*, March 1976, "Additives 76", pages 3–4, the disclosure of which is incorporated herein by reference. Certain pigments and fillers conventionally employed in vinyl halide resins also serve as opacifying or pearlescent agents for the resin, for example sulfates of lead (which, as mentioned above, also function as stabilizers for the resin).

The compositions of the invention are essentially of the rigid vinyl halide resin type which contain no more than about 10 weight percent of a plasticizer for vinyl halide graft polymer and preferably are free of said plasticizing additive. Typical suitable plasticizer additives (which are generally organic compounds) conventionally employed in polyvinyl halide compositions include, for example, the esters of aliphatic alcohols of medium chain length, e.g. of 7 to 11 carbon atoms, with phenyl dicarboxylic acids, e.g. di-n-octyl phthalate and di-isononyl phthalate as well as organic phosphate esters such as cresyl-diphenyl-phosphate and octyl diphenyl-phosphate. The chemical structure and technology of plasticizers conventionally employed in polyvinyl halide compositions is more particularly discussed in L. R. Brecker, op. cit. page 5, the disclosure of which is incorporated herein by reference.

The proportion of the block thermoplastic elastomer which is employed to provide enhancement of low temperature impact resistance upon ageing in accordance with the invention is generally of the order of about 1% to about 20%, preferably about 1% to about 15%, and especially about 2% to about 10% based on the combined weight of the vinyl halide graft polymer component and the block elastomer component.

With respect to the above-described optional additives for the compositions of the invention, i.e. stabilizers, lubricants, processing aids, fillers, plasticizers, dyes and pigments, the amount of each type of additive employed is desirably about 0.01 to about 5 weight percent, preferably about 0.1 to about 3 weight percent based on the combined weight of the graft polymer and block polymer additive.

The compositions of the invention are prepared by mixing and milling techniques conventional for mechanically blending polymer additives with vinyl halide resins. Generally the vinyl halide-polyolefin graft polymer is admixed with any of the above-described optional additives to be incorporated in the composition in an appropriate mixing apparatus, e.g. a Henschel mixer, advantageously at moderately elevated temperature. The resulting mixture containing the graft polymer is then admixed with the block elastomer in a roll mill, e.g. a Farrell mill, to mill the components of the mixture to a fused sheet which is advantageously granulated to a powder in a conventional granulating apparatus. The resultant polymer blend is then molded into a desired shape such as a pipe, bar, rod, etc., advantageously by an injection molding technique.

The following examples further illustrate the various aspects of the invention but are not intended to limit it. Various modifications can be made in the invention without departing from the spirit and scope thereof. In this specification and claims, where not otherwise specified, temperatures are given in degrees centigrade, and all parts, proportions, ratios and percentages are by weight.

EXAMPLE 1

To a small heated Prodex Henschel mixer operating at about 3800 r.p.m. and 130° F., there is added 1500 g. of a vinyl chloride-graft-polyolefin polymer (9% graft polymer content) wherein the polyolefin is an ethylene-propylene-ethylidene norbornene terpolymer which has been prepared by bulk free radical liquid phase polymerization substantially as described in aforementioned U.S. patent application Ser. No. 746,046. After the mixing operation has proceeded for 5 minutes, the temperature of the mass is 150° F. and there is added 45 g. of a proprietary monohydrous tribasic lead sulfate stabilizer conventionally employed for vinyl halide polymers (manufactured by National Lead Co. under the designation Tribase AG) and 15 g. of a proprietary dibasic lead stearate stabilizer conventionally employed for vinyl halide polymers (manufactured by National Lead Co. under the designation DS-207). After the mixing has proceeded for an additional two minutes, the temperature of the mixture is about 160° F. and there is added to the mixture 30 g. of a proprietary copolymer of ethylacrylate (13%) and methyl methacrylate (87%) conventionally employed as a processing aid additive in vinyl halide polymers (manufactured by Rohm and Haas Corp. under the designation Acryloid K-120-ND). After the mixing operation has proceeded for an additional 5 minutes, the temperature of the mixture is 190° F. and there is added to the mixture 15 g. of a proprietary organic lubricant conventionally employed for external lubrication of vinyl halide polymers (manufactured by American Hoechst Corp. under the designation XL-165). After the mixing operation has been carried out for an additional 3 minutes, i.e. for a total mixing time of 15 minutes, the temperature of the mixture is 210° F. and the mixture is discharged from the mixing apparatus and allowed to cool to ambient temperature.

The resultant mixture is divided into three equal portions which are reserved for milling according to the following procedure.

To a Farrell Mill operating at the following conditions:

| | |
|---|---|
| Front Roll Temperature | 355°–360° F. |
| Back Roll Temperature | 330°–335° F. |

-continued

| Speed | 48 r.p.m. |
|---|---| there is added 25 g. of a proprietary radial block thermoplastic elastomer of 1,3-butadiene and styrene, said copolymer containing 70% 1,3-butadiene and 30% styrene (manufactured by Phillips Petroleum Co. under the designation Solprene 411-P). The elastomer is milled for 5 minutes and then one of the aforementioned portions of the above-described mixture is added to the mill. The resultant mixture is milled for about 5 minutes and then is sheeted from the mill. The foregoing milling procedure is repeated with the two remaining portions of the mixture from the Prodex-Henschel mixer so that a total of 75 g. of the block elastomer is blended with the vinyl chloride graft polymer.

The sheets obtained from the milling operation are combined and pulverized in a Rapid Granulator. The heat distortion temperature at 264 psi of the resultant mixture is measured in accordance with ASTM Test D-648. Also the equilibrium torque and the heat stability of the molten mixture in a Brabender Plastograph operating at 204° and 63 r.p.m. is determined.

The pulverulent mixture is charged to an Arburg 200 Injection Molding machine operating at the following cylinder temperature settings, Zone 3—320° F., Zone 2—350° F., and Zone 1—370° F., a mold temperature of 100° F. and an injection pressure of 15,000 psi to obtain impact test bar samples 5 inches in length, ½ inch in width and ⅛ inch thickness. Some of these samples are immediately tested for impact resistance (according to the notched Izod Impact Resistance Test of ASTM D-256) at both ambient temperature i.e. about 20° F. and sub-ambient temperature, i.e. −20° F.). The remaining portion of bar samples are subjected to accelerated ageing by being heated in a forced draft oven at 65° for about 48 hours. The aged bars are then tested for impact resistance at −20° F. according to the aforementioned procedure. The results of the foregoing Example are reported in the Table below.

EXAMPLE 2

The procedure of Example 1 is repeated substantially as described except that the block thermoplastic elastomer employed is a proprietary radial block copolymer of 1,3-butadiene and styrene wherein the proportions of 1,3-butadiene and styrene are respectively 60% and 40% (manufactured by Phillips Petroleum Co. under the designation Solprene 414-P). The results of this Example are compared with those of Example 1 in the Table below.

EXAMPLE 3

The procedure of Example 1 is repeated substantially as described except that the block thermoplastic elastomer employed is a proprietary triblock copolymer of isoprene and styrene containing 86% isoprene and 14% styrene (manufactured by Shell Chemical Co. under the designation Kraton 1107). The results of this Example are compared with those of Example 1 and 2 in the Table below.

EXAMPLE 4 (Control)

The procedure of Example 1 is repeated substantially as described except that the thermoplastic block elastomer is omitted. The results of this Example are compared with those of the preceeding Examples in the Table below.

EXAMPLE 5 (Comparative)

In a Comparative Example the procedure of Examle 1 is repeated substantially as described except that in place of the block thermoplastic elastomer of Example 1 there is employed a proprietary triblock thermoplastic elastomer of 1,3-butadiene and styrene which has been selectively hydrogenated to remove ethylenic unsaturation in the butadiene residue block (so that the elastomer is, in effect, a triblock polymer having polystyrene end blocks and a midblock of 1-butylene-ethylene copolymer as a result of the hydrogenation). The latter hydrogenated thermoplastic block elastomer (the general structure of which is illustrated in FIG. 7, page 131 of "The Encyclopedia of Polymer Science and Technology" Supplement, Vol. 2, op. cit.) is manufactured by Shell Chemical Co. under the designation Kraton GX-6521. The results of this Example are also set forth in the Table below.

EXAMPLES 6–8 (Comparative)

The procedure of Example 1 is repeated substantially as described in Comparative Examples 6–8 wherein the thermoplastic block elastomer of Example 1 is replaced by different thermoplastic elastomers not having a block configuration as follows:

Example 6—a proprietary cross-linked acrylonitrile-1,3-butadiene copolymer containing 41% acrylonitrile conventionally employed as a vinyl halide polymer additive (manufactured by B. F. Goodrich Chemical Co. under the designation Hycar 1411)

Example 7—a proprietary acrylonitrile-1,3-butadiene copolymer containing about 33% acrylonitrile (manufactured by B. F. Goodrich Chemical Co. under the designation Hycar 1452P-50)

Example 8—a proprietary acrylonitrile-styrene copolymer (manufactured by Dow Chemical Co. under the designation Tyril)

The results of these Comparative Examples are compared with those of Examples 1–5 in the Table below.

Table

| Example | Elastomer Additive | Equilibrium Torque(m.g.) | Heat Stability (min.) | Heat Distortion Temperature (degrees) | Notched Izod Impact Resistance (ft-lbs/in) | | | Gain or Loss in Notched Izod Impact Resistance At −20° F. On Ageing (%) |
|---|---|---|---|---|---|---|---|---|
| | | | | | No Ageing | | After Ageing | |
| | | | | | Ambient Temp. | −20° F. | −20° F. | |
| 1 | Solprene 411-P | 957 | 12–13 | 60.0 | 19.6 | 1.11 | 1.30 | Gain - 17.2% |
| 2 | Solprene 414-P | 927 | 13–14 | 62.3 | 17.3 | 1.10 | 1.20 | Gain - 9.1% |
| 3 | Kraton 1107 | 844 | 13–14 | 59.0 | 17.4 | 0.80 | 0.83 | Gain - 3.8% |
| 4 | None | 916 | 15–16 | 62.5 | 18.7 | 1.35 | 0.88 | Loss - 35% |
| 5 | Kraton G | 855 | 16–17 | 62.5 | 20.8 | 0.89 | 0.86 | Loss - 3.4% |

Table-continued

| Example | Elastomer Additive | Equilibrium Torque(m.g.) | Heat Stability (min.) | Heat Distortion Temperature (degrees) | Notched Izod Impact Resistance (ft-lbs/in) No Ageing Ambient Temp. | No Ageing −20° F. | After Ageing −20° F. | Gain or Loss in Notched Izod Impact Resistance At −20° F. On Ageing (%) |
|---|---|---|---|---|---|---|---|---|
| | X-6521 | | | | | | | |
| 6 | Hycar 1411 | 1100 | 12–13 | 58.0 | 17.4 | 0.89 | 0.84 | Loss - 5.6% |
| 7 | Hycar 1452-P-50 | 938 | 12–13 | 53.0 | 15.1 | 1.09 | 0.86 | Loss - 21% |
| 8 | Tyril | 942 | 12–13 | 61.5 | 13.2 | 0.88 | 0.84 | Loss - 4.5% |

Notes:
1. All of the molded products were of similar appearance: cream color, opaque, smooth surface without roughness or surface solid exudates.
2. All of the elastomer additives of vertical column 2 of the Table are present in a proportion of 5 parts per 100 parts of the vinyl halide-graft-polyolefin polymer corresponding to about 4.76% based on the combined weight of the elastomer additive and the vinyl halide graft polymer.
3. The percentage of gain or loss of low temperature impact resistance on ageing in the last vertical column of the Table is computed by dividing the change in low temperature impact resistance between the non-aged sample and the aged sample by the low temperature impact resistance of the non-aged sample and multiplying the result by 100.

A comparison of the results of the illustrative examples of the invention, i.e. Examples 1–3 with Control Example 4 (containing unmodified vinyl halide graft polymer) indicates that while the addition of the present thermoplastic block elastomers according to the invention to the vinyl halide graft polymer results in an initial lowering of the low temperature impact resistance compared to that of the graft polymer, the low temperature impact resistance of the compositions of the invention increases on accelerated ageing (substantially equivalent to ageing at ambient temperature for about 1 month or longer). Comparison of the results of the aforementioned illustrative Examples with those of the comparative Examples, i.e. Examples 5–8, indicates that other thermoplastic elastomer additives (including non-block polymers and a block polymer having structural features distinctive from the additives of the invention as in the block elastomer additive of Example 5) do not impart age-enhancement of low temperature impact resistance to the graft polymer composition as does the block thermoplastic additive of the invention.

Comparison of the data of vertical columns 3, 4 and 5 of the Illustrative Examples and the corresponding data of Control Example 4 indicates that the fusion time and heat stability (Brabender Plastograph data) and the best distortion temperature of the graft polymer are not diminished substantially by the admixture of the graft polymer with the block thermoplastic elastomer of the invention. Comparison of the ambient temperature impact resistance of the products of the Illustrative Examples with that of the product of the Control Example indicates that the additive of the invention does not substantially diminish the ambient temperature impact resistance of the graft polymer on admixture with the graft polymer according to the invention.

The invention has been described in the above specification and illustrated by reference to specific embodiments in the illustrative examples. However, it is to be understood that these embodiments are not intended to limit the invention since changes and modifications in the specific details disclosed hereinabove can be made without departing from the scope or spirit of the invention.

What is claimed is:

1. In a vinyl halide-graft-hydrocarbon polyolefin polymer composition capable of being molded to an impact resistant article, the improvement wherein the composition comprises a block thermoplastic elastomer wherein the major proportion of the monomer units are residues of a mono-alkenyl arene of the benzene or naphthalene series of 8 to 20 carbon atoms and a conjugated alkadiene hydrocarbon of 4 to 10 carbon atoms, the proportion of block elastomer being about 1% to 20% based on the combined weight of the graft polymer and the block elastomer.

2. The composition of claim 1 wherein the alkenyl arene is of the benzene series and the vinyl halide-hydrocarbon polyolefin graft polymer is the product of the free radical liquid phase bulk polymerization of vinyl halide monomer alone or in combination with up to 50% based on the total weight of monomer of another ethylenically unsaturated monomer copolymerizable to the vinyl halide and about 0.05% to about 20%, based on said vinyl halide monomer, of a trunk polymer consisting essentially of an olefin polymer of a weight average molecular weight of about 50,000 to about 1,000,000 which is selected from the group consisting of:

(A) a homopolymer of an aliphatic hydrocarbon olefin monomer of 2 to 8 carbon atoms;
(B) a copolymer of 2 or more of said olefin monomers; and
(C) a polymer of at least one of said olefin monomers and up to about 15%, based on the weight of the polymer, of a non-conjugated aliphatic hydrocarbon polyene of 4 to 18 carbon atoms wherein all of the carbon-to-carbon double bonds do not form a conjugated system, said olefin polymer being soluble, partially soluble or dispersable in said polymerization reaction.

3. The composition of claim 2 wherein the vinyl halide is vinyl chloride, the alkenyl arene is a hydrocarbon and the ratio of alkenyl arene monomer residues to conjugated alkadiene monomer residues in the block elastomer is about 1:1 to about 1:10.

4. The composition of claim 3 wherein the conjugated alkadiene is 1,3-butadiene or isoprene and the alkenyl arene compound is a vinyl arene.

5. The composition of claim 4 wherein the block elastomer is present at a proportion of about 1% to about 15%, the conjugated alkadiene is 1,3-butadiene, the vinyl area is styrene and the ratio of styrene residues to 1,3-butadiene residues in the block polymer is about 1:1.5 to about 1:2.3.

6. The composition of claim 5 wherein the proportion of the block elastomer is about 2% to about 10%, the vinyl halide graft polymer is prepared by polymerization in the presence of about 1 to about 20% of the olefin trunk polymer and the olefin trunk polymer has a weight average molecular weight of about 50,000 to about 300,000.

7. The composition of claim 6 wherein the olefin trunk polymer is a copolymer of two aliphatic hydrocarbon olefin monomers.

8. The composition of claim 7 wherein the olefin trunk polymer is an ethylene-propylene copolymer.

9. The composition of claim 6 wherein the olefin trunk polymer is a polymer of at least one aliphatic hydrocarbon olefin monomer and a non-conjugated aliphatic hydrocarbon polyene.

10. The composition of claim 9 wherein the olefin trunk polymer is a terpolymer of two aliphatic hydrocarbon olefin monomers and the non-conjugated polyene, and said non-conjugated polyene is a diene present in said trunk polymer in a proportion up to about 6% based on the weight of said trunk polymer.

11. The composition of claim 10 wherein the trunk polymer is an ethylene-propylene-ethylidene norbornene terpolymer.

12. The composition of claim 11 wherein the block elastomer is a styrene-1,3-butadiene radial block elastomer containing a ratio of styrene to 1,3-butadiene of about 1:2.3.

13. The composition of claim 12 wherein the block elastomer is a styrene-1,3-butadiene radial block elastomer containing a ratio of styrene to 1,3-butadiene of about 1:1.5.

14. The impact resistant molded article of the composition of claim 1.

15. A vinyl chloride-graft-polyolefin polymer composition which is capable of being molded to an impact resistant article having enhanced low temperature impact resistance on ageing, comprising a mixture of:

(I) a vinyl chloride-graft-polyolefin polymer prepared by free-radical bulk liquid phase polymerization of vinyl chloride in the presence of about 0.05% to about 20% based on the weight of vinyl chloride of a trunk polymer consisting essentially of an olefin polymer of a weight average molecular weight of about 50,000 to about 1,000,000 which is selected from the group consisting of:

(A) a homopolymer of an aliphatic hydrocarbon olefin monomer of 2 to 8 carbon atoms, (B) a copolymer of 2 or more of said olefin monomers, and (C) a polymer of at least one of said olefin monomers and up to about 15%, based on the weight of the polymer, of a non-conjugated aliphatic hydrocarbon polyene of 4 to 18 carbon atoms wherein all of the carbon-to-carbon double bonds do not form a conjugated system, said olefin polymer being soluble, partially soluble or dispersable in said polymerization reaction, and (II) a block thermoplastic elastomer of styrene and 1,3-butadiene, the proportion of styrene to 1,3-butadiene in said block elastomer being about 1:1.5 to about 1:2.3 and the proportion of said block elastomer present in the composition being about 2% to about 10% based on the combined weight of the vinyl chloride graft polymer and the block elastomer.

* * * * *